United States Patent
Hill

(10) Patent No.: US 9,875,096 B2
(45) Date of Patent: Jan. 23, 2018

(54) SYSTEMS AND METHODS FOR SOFTWARE SCANNING TOOL

(71) Applicant: Wal-Mart Stores, Inc., Bentonville, AR (US)

(72) Inventor: Kevin E. Hill, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 19 days.

(21) Appl. No.: 15/069,510

(22) Filed: Mar. 14, 2016

(65) Prior Publication Data

US 2016/0274903 A1     Sep. 22, 2016

Related U.S. Application Data

(60) Provisional application No. 62/134,232, filed on Mar. 17, 2015.

(51) Int. Cl.
*G06F 9/44* (2006.01)

(52) U.S. Cl.
CPC . *G06F 8/70* (2013.01); *G06F 8/71* (2013.01)

(58) Field of Classification Search
CPC .................................. G06F 8/70; G06F 8/71
USPC ......................................................... 717/120
See application file for complete search history.

(56) References Cited

U.S. PATENT DOCUMENTS

| | | | |
|---|---|---|---|
| 5,898,872 A | 4/1999 | Richley | |
| 7,370,281 B2 * | 5/2008 | Weber | G06F 3/0486 715/769 |
| 7,904,802 B1 | 3/2011 | Kolawa et al. | |
| 8,160,947 B2 | 4/2012 | Oey | |
| 2009/0254538 A1 * | 10/2009 | Arthurs | G06F 17/2288 707/999.005 |
| 2011/0161938 A1 * | 6/2011 | Marum | G06F 8/77 717/131 |
| 2012/0210298 A1 * | 8/2012 | Hodgins | G06F 8/71 717/113 |
| 2014/0068559 A1 | 3/2014 | Szocs | |

OTHER PUBLICATIONS

Banker et al., "Repository Evaluation of Software Reuse", IEEE, 1993, 10pg.*
Inoue et al., "Ranking Significance of Software Components Based on Use Relations", IEEE, 2005, 12pg.*
Linstead et al., "Sourcerer: mining and searching internet-scale software repositories", Springer Science+Business Media, 2008, 37pg.*

* cited by examiner

*Primary Examiner* — Ryan Coyer
(74) *Attorney, Agent, or Firm* — McCarter & English, LLP; David R. Burns

(57) ABSTRACT

Systems, methods, and non-transitory machine readable medium are provided for creating a structured report that aggregates information related to a plurality of source code files based on selective scanning of one or more repositories. A repository search request is received including a repository identifier, a project identifier, and a search term. The specified repository is scanned to identify source code files for the specified project that include the search term. It is determined whether an instance of a search term within the source code file corresponds to a reserved term. A report is generated identifying the source code files that include an instance of the search term. A new file directory is created, and populated with a first results file including the generated report.

20 Claims, 8 Drawing Sheets

```
                    !!! SUCCESSFUL !!!
             **********---------> C O M P L E T I O N <---------**********

Please review your OUTPUT FILES for further analysis:

402 — A. AHP Configurations  - Number of AntHill Pro Configurations
                                      processed.
                                      TOTAL: [2]

404 — B. Program Files        - Number of Application programs processed.
                                      TOTAL: [94]

406 — C. PGM_NAME.MATCHES     - Contains the names of the program files
                                      where MATCHES WERE detected.

408 — D. PGM_NAME.ZERO        - Contains the names of the program files
                                      where MATCHES were NOT detected.

Summary Information
             -------------------

410 — There were [87] files with SNE mnemonic search terms detected.

412 — There were [9] files with NO search terms detected.
```

FIG. 4

```
212
213  4:# SYSTEM   : Wal-Mart Store Systems
214  7:#            lwpickup in stores.
215  50:STORE=`/u/bin/stanzaget /u/data/store.cfg store site`
216  51:COUNTRY=`/u/bin/stanzaget /u/data/store.cfg national country`
217  52:PURPOSE=`/u/bin/stanzaget /u/data/store.cfg store purpose`
218  53:LOGFILE="${BASENAME}.${STORE}_${COUNTRY}"
219  ~~~~~~~~~~~~~~~~~~~~~~~~~~~~~~~~~~~~~~~~~~~~~~~~~~~~~~~~~~
220  +                                                         +
221  + Data from the ABOVE MATCH is as follows:                 +
222  +                                                         +
223  + SEARCH TERM:==> [ STORE ]
224  +                                                         +
225  + FILENAME of MATCHED Search Term:==> [ install_pickup.ksh ]
226  ==========================================================
227
```

FIG. 5

```
147
148  45:typedef XXXXXX STRUC_EMSTAT
149 180:typedef XXXXXX STRUC_C_EMLOGFIL
150 210:typedef XXXXXX STRUC_I_EMLOGFIL
151 245:typedef XXXXXX STRUC_I_EMLOG
152 280:typedef XXXXXX STRUC_I_DEFFMT
153 305:typedef XXXXXX STRUC_I_ERRDEF
154 343:typedef XXXXXX STRUC_I_ERRVAL
155 356:typedef XXXXXX STRUC_EMCMD
156 ^^^^^^^^^^^^^^^^^^^^^^^^^^^^^^^^^^^^^^^^^^^
157 +                                          +
158 + Data from the ABOVE MATCH is as follows: +
159 +                                          +
160 + SEARCH TERM:==> [ STR ]
161 +                                          +
162 + FILENAME of MATCHED Search Term:==> [ wmeman.h ]
163 ==========================================================
164
```

SYSTEMS AND METHODS FOR SOFTWARE SCANNING TOOL

RELATED APPLICATION

This application claims priority to U.S. Provisional Patent Application No. 62/134,232 entitled "Systems and Methods for Software Scanning Tool," filed on Mar. 17, 2015, which is hereby incorporated by reference in its entirety.

BACKGROUND

A software application often contains numerous software program files with hundreds of lines of software code. One of the issues with managing a software application is that all relevant program files need to be updated and modified to reflect changes to the objectives of the software application. Updating a software application requires a programmer to research each program file, which is labor intensive and time consuming. This can be compounded in an enterprise environment where there can be a large number of software applications having a large number of program files.

BRIEF DESCRIPTION OF THE DRAWINGS

The foregoing and other features and advantages provided by the present disclosure will be more fully understood from the following description of exemplary embodiments when read together with the accompanying drawings, in which:

FIG. 4 is an exemplary user interface illustrating a summary report for a software scanning tool, according to example embodiments;

FIG. 5 is an exemplary user interface illustrating a report for a software scanning tool, according to example embodiments;

FIG. 6 is an exemplary user interface illustrating a report with a reserved term for a software scanning tool, according to example embodiments;

FIG. 7 is an exemplary user interface illustrating file directories generated by a software scanning tool, according to example embodiments.

DETAILED DESCRIPTION

Figure 1:
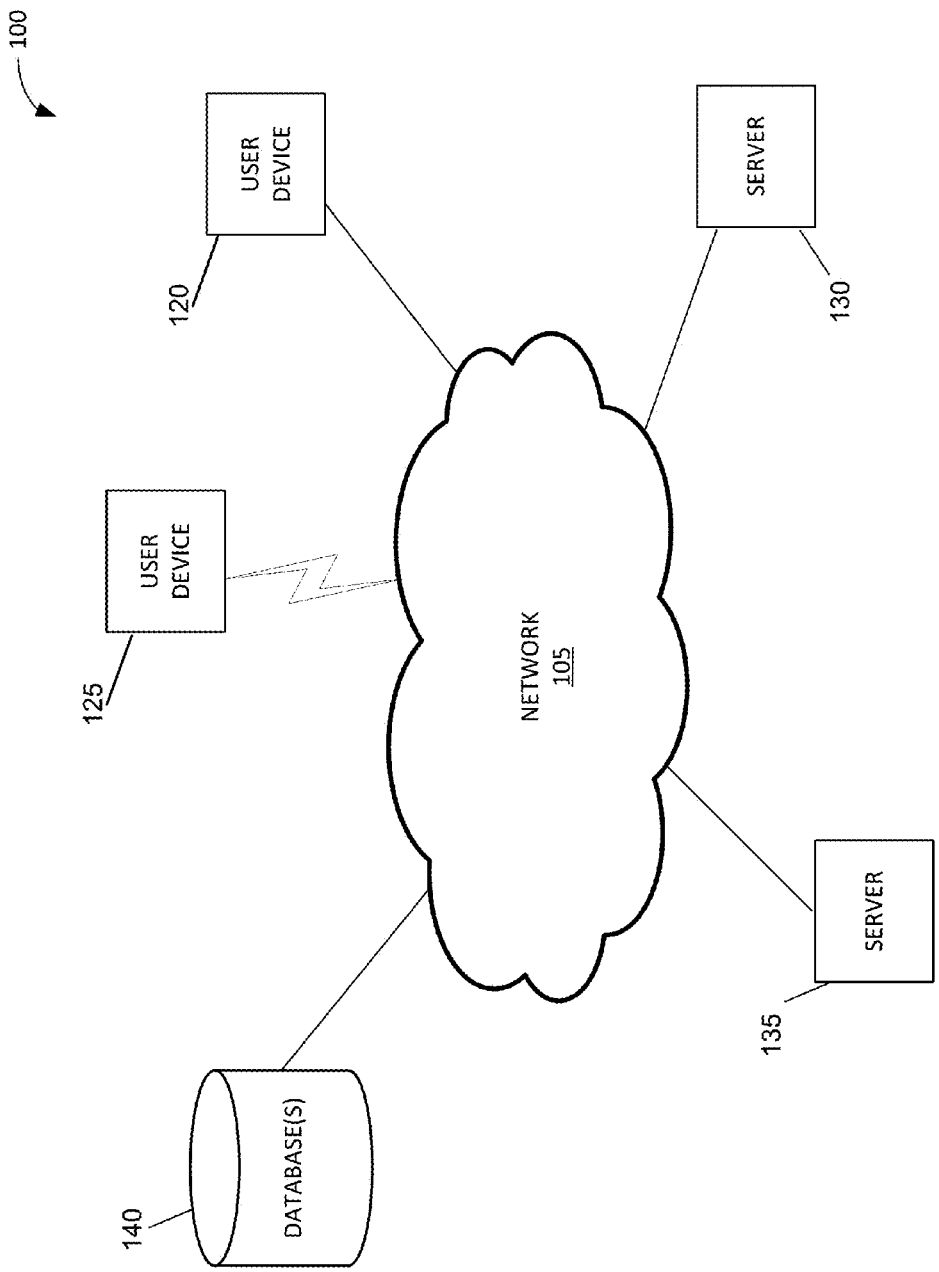
FIG. 1 is a diagram of an exemplary network environment suitable for a distributed implementation of exemplary embodiments.

Systems, methods, and non-transitory computer readable medium are described for a software scanning tool. Example embodiments provide for creating a structured report that aggregates information related to a plurality of source code files based on selective scanning of one or more software repositories.

A software project or application contains numerous software source code files. Moreover, an enterprise entity or a business unit may have numerous software projects that it develops and manages. When updates and modifications are required to the software project, it takes a great effort and time for a programmer to review each source code file and determine whether the code needs to be updated. For example, a specific variable may need to be updated in many of the source code files associated with one or more projects to accommodate changes in the software project or the business unit. In this case, typically a programmer would manually locate the variable in each source code file, and determine whether it needs to be updated. Moreover, the programmer often would have to manually track the files that he already reviewed in a project versus the files that still need to be reviewed. Often there is a large number of software projects including a large number of source code files that need to be reviewed, which can make this approach impractical, if not impossible. Additionally, it is inefficient for another programmer to pick-up where the previous programmer left-off with the review process because of the manual tracking. Moreover, this manual process is prone to user errors.

Search tools exist where a user can search through software code to locate a specific term. However, some of these conventional tools require the user to download the software project and source code files onto the user's computer to be able to search the files. Other conventional tools require the user to painstakingly search each of the software modules for a search term, and determine whether the software module needs to be flagged for modification.

The various embodiments of the software scanning tool described herein provides a comprehensive solution to the time-intensive and error-prone processes of conventional source code review and modification campaigns. The software scanning tool provides an automated process that allows the user to select specific software repositories related to an application, execute a scan of the specified repositories in real-time, and generate reports providing the user with specific details and context on the user of a search term.

The software scanning tool described herein eliminates the time intensive tasks used by conventional methods, and eliminates the possibility of annotation errors. The software scanning tool also allows a user to share the results of their scans, via the generated reports, with other users giving them the ability to make modifications to the identified modules simultaneously and reduce the overall amount of time spent on updating software projects. Additionally, a user can access the software module via the results, and can modify the software code while viewing the results.

For illustrative purposes, a specific example is described. In this example, an enterprise entity, such a retail store enterprise, develops and manages numerous software projects to enable the entity to perform various functions and operations related to its business. The enterprise may add more stores to expand its geographic business presence. This expansion of stores requires updates to the software projects and code to accommodate the increase in the number of stores. Therefore, the programmers need the ability to locate, identify, and determine the software projects and processes used by the enterprise that need to be modified for expansion in store number. Depending on the software project, anywhere from three to hundreds of individual software modules may need to be reviewed and modified. In this example, the number of stores may be represented by the variable "ssn_number" in some instances of software code, but can be represented by other variable designation in other instances of software code. The user can input "ssn_number" (as well as the other variable designations) as the search term(s) in the scanning tool. The user can use the software scanning tool described herein to scan and review multiple software repositories for the search term.

In some embodiments, the software scanning tool described herein provides the user with the ability to search for specific or multiple search terms within any program which resides within a single or multiple repositories. The software scanning tool determines that a match has been found for a search term, and creates a verbose report detailing where the search term was found, for example, the line number in the software module. The software scanning tool also generates a code segment or snippet that contains the search term, which provides the user a context on how the search term is used within the code. The name of the software modules where matches are found are also provided to the user as part of the results of the scanning tool, so the user can directly research how the term is used programmatically. If a module within a repository does not have any matches against the search term or terms, a report is generated by the software scanning tool listing the name of such module. This eliminates the user spending time and effort reviewing the modules that do not contain the search term. In an example embodiment, the software scanning tool provides real-time metrics to the user detailing the repository being scanned, the current software module being scanned, the number of modules processed, and the number of matches and non-matches found. Once the scanning tool has completed its execution, it provides summary information to the user via a user interface, and maintains the repositories with their programs intact for further analysis.

In an example embodiment, the software scanning tool may be implemented in UNIX, and may be used to scan UNIX-based applications.

As used herein, a "software repository" refers to a storage location for software projects or packages in a non-transitory computer-readable medium. A repository can be used to organize and package source code files related to one or more software projects or software applications, and can refer to the location (physical or logical) at which the software projects and the source code files are stored in the repository and can be identified based on paths in a file directory. The repository may be a storage location in a database.

As used herein, a "software project" refers to a plurality of source code files that together are programmed to perform one or more objectives of the software project by communicating instructions to a computing system and controlling the behavior of the computing system.

As used herein, a "software module" refers to a part of a software program which is embodied in a source code file. Software programs may compose of one or more independently developed modules that are not combined until the software program is linked and ready for runtime. These modules are typically represented as text in a software programming language that forms the contents of source code files.

A "search term", as used herein, can be any string including one or more alphanumeric characters and/or special characters.

A "reserved term", as used herein, can be any string including one or more alphanumeric characters and/or special characters. A reserved term may be a term that is specifically defined and used in a programming language to write software code and enables communication of instructions to a computing system. For example, a reserved term may be "if," "then," or "else" based on the if-then-else conditional construct that is commonly used in programming language.

The following description is presented to enable any person skilled in the art to create and use a computer system configuration and related method and systems to create a structured report that aggregates information related to a plurality of source code files based on selective scanning of one or more software repositories. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

FIG. 1 illustrates a network diagram depicting a system 100 for a software scanning tool according to an example embodiment. The system 100 can include a network 105, multiple user devices, for example, user device 120, user device 125, multiple servers, for example, server 130, server 135, and database(s) 140. Each of the user devices 120, 125, servers 130, 135, and database(s) 140 is in communication with the network 105.

In an example embodiment, one or more portions of network 105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user devices 120, 125 may comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Each of user devices 120, 125 may connect to network 105 via a wired or wireless connection. Each of user devices 120, 125, may include one or more applications such as, but not limited to, a software scanning application, a software coding application, and the like. In an example embodiment, the user devices 120, 125 may perform all the functionalities described herein.

In other embodiments, the software scanning tool may be included on the servers 130, 135, and the servers 130, 135 perform the functionalities described herein. In yet another embodiment, the user devices 120, 125 may perform some of the functionalities, and servers 130, 135 perform the other functionalities described herein. For example, user devices 120, 125 may receive a repository search request, while servers 130, 135 may scan the specified repository for a search term and generate a report identifying the source code files that include an instance of the search term.

Each of the database(s) 140, and servers 130, 135 is connected to the network 105 via a wired connection. Alternatively, one or more of the databases 140, and servers 130, 135 may be connected to the network 105 via a wireless connection. Server 130, 135 comprise one or more computers or processors configured to communicate with user devices 120, 125 via network 105. Server 130, 135 hosts one or more applications or websites accessed by user devices 120, 125 and/or facilitates access to the content of database(s) 140. Database(s) 140 comprise one or more storage devices for storing data and/or instructions (or code) for use by server 130, 135, and/or user devices 120, 125. Database(s) 140 and server 130, 135 may be located at one or more geographically distributed locations from each other or from user devices 120, 125. Alternatively, database(s) 140 may be included within server 130, 135.

Figure 2:
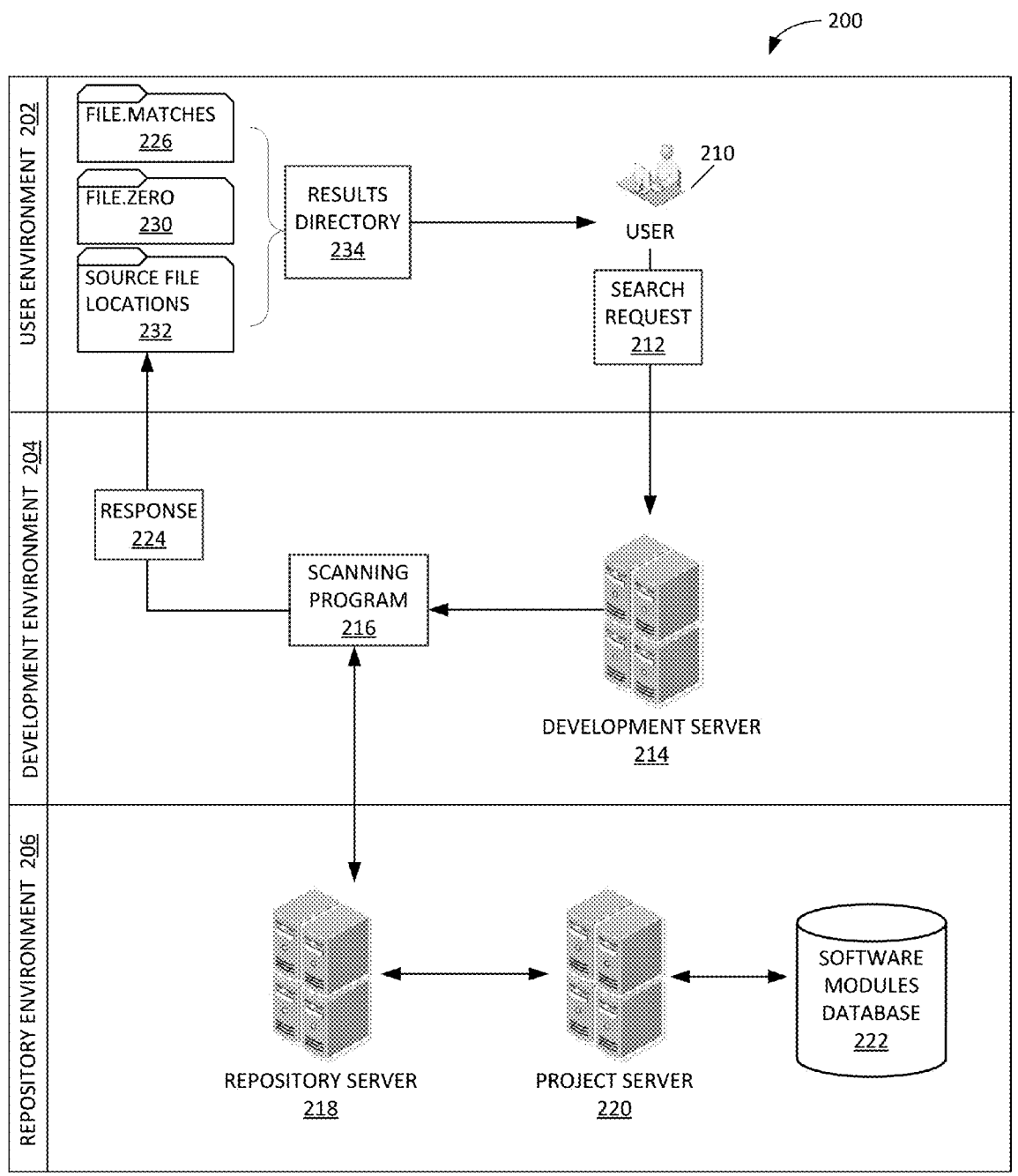
FIG. 2 depicts a system for a software scanning tool, according to example embodiments.

FIG. 2 depicts a system 200 for a software scanning tool, according to an example embodiment. One or more components of system 200 may be implemented in one or more user devices 120, 125. In other embodiments, one or more of components of system 200 may be included in one or more servers 130, 135 while other of the components of system 200 are provided in user devices 120, 125. The components of system 200 may include various circuits, circuitry and one or more software components, programs, applications, apps or other units of software code base or instructions configured to be executed by one or more processors included in user devices 120, 125 or server 130, 135. The system 200 includes a user environment 202, a development environment 204, and a repository environment 206.

The user environment 202 may be configured to receive a search request 212 from a user via a user device 210, and communicate the search request 212 to a development server 214 of the development environment 204. The search request 212 can include a repository identifier to identify a repository in which source code files are stored for a plurality of software projects, a project identifier associated with a specified software project corresponding to one of the plurality of software projects stored in the specified repository, and at least one search term. In some embodiments, the search request 212 can also include one or more reserved terms. In some embodiments, the one or more reserved terms can be retrieved by the development server 214 in response to the search request 212 and/or in response to the results of the search request 212. For example, the development server 214 can be programmed to determine which programming language(s) are used in the source code files as part of the code scan, and the reserved terms associated with those programming language(s) can be retrieved by the development server for use in generating a report. After execution of the scanning program 216, which scans the specified repository for source code files associated with the specified software project that include the search term, the user environment 202 provides the results directory 234 to the user 210. The results directory 234 comprises a matches file 226 including a report identifying the source code files that contain the search term, a zero matches file 230 including a report identifying the source code files that do not contain the search term, and a locations file 232 including a report that contains the location of the scanned source code files. In some embodiments, the locations file 232 includes a list of the locations of the source code files that include the search term.

The development environment 204 includes the scanning program 216. In response to receiving information from the search request 212, the scanning program 216 is programmed to communicate to a repository server 218 of the repository environment 206 to access the source code files associated with the repository specified in the search request 212 by the repository identifier. The scanning program 216 is further programmed to scan the source code files associated with the specified repository and specified project for the search term(s) specified in the search request 212. The scanning program 216 is further programmed to determine whether a source code file includes an instance of the search term(s). Based on the results of the scan, the scanning program 216 is programmed to generate a response 224, including a report that identifies the source code files that include an instance of the search term. The report further includes a line number in the source code file where the instance of the search term is found, a name of the software module within the source code at which the instance of search term was found, and a segment of the source code that contains the instance of the search term.

The scanning program 216 is further programmed to determine whether any instance of search term(s) identified in the source code files corresponds to a reserved term based on the context or usage of the instance of the search term within the source code. The report as part of the response 224 indicates whether an instance of the search term corresponds to a reserved term. The report may include this indication, such as a visual indicator, in the segment of the code.

The repository environment 206 includes a repository server 218, a project server 220, and a software modules database 222. In response to receiving a specified repository and a specified project (e.g., based on repository and project identifiers included in a request), the repository server 218 communicates to the project server 220, which in turn communicates to the software module database 222 to retrieve the software modules and source code files associated with the specified project in the specified repository. The retrieved modules and source code files are made available to the scanning program 216 to perform one or more scanning functions.

Figure 3:
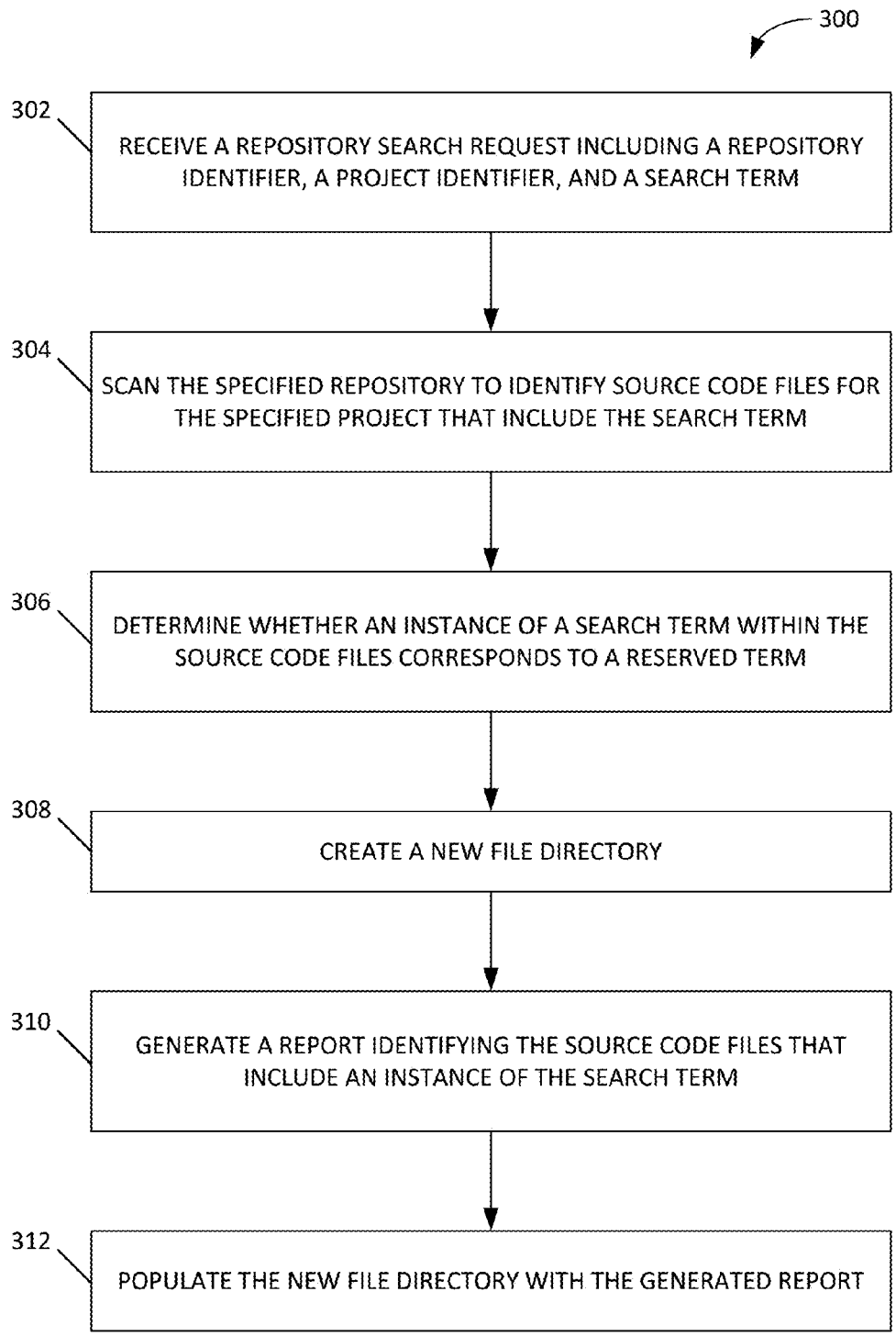
FIG. 3 is a flowchart illustrating an exemplary method for generating a search report for specified software repositories, according to example embodiments.

FIG. 3 is a flowchart illustrating an exemplary method 300 for generating a search report for specified software repositories, according to an example embodiment. The method 300 may be performed using or one or more components of system 100 and system 200 described above.

At block 302, the development environment 204 receives, from the user environment 202, a repository search request including a repository identifier, a project identifier, and at least one search term. A user inputs a search request via a user interface provided by the user environment 202 at the user device 210 (e.g., a user device 120 or 125). The search request includes a repository identifier associated with a particular software repository in which source code files are stored for one or more software projects or software applications. The search request also includes a project identifier associated with a particular software project within the identified repository. The search request further includes one or more search terms that the source code files are scanned for. A user may input a plurality of search terms simultaneously via the user interface, and the scanning tool scans the source code files for the plurality of search terms simultaneously. A user can also input a plurality of repository identifiers associated with a plurality of software repositories that should be scanned.

In an example embodiment, the user may provide a repository identifier in the form of a hyperlink that represents a repository, which when selected directs the user to the corresponding software repository in an appropriate repository environment or repository user interface. The hyperlink for the repository may be provided and automatically generated by a software programming tool that enables a user to develop and test software code. In some embodiments, the repository identifier can be in the form of universal resource locator (URL), or an established directory path that can be followed. The software programming tool may be independent and separate from the software scanning tool or the software programming tool and the software scanning tool can be integrated. As discussed above, the user may provide a plurality of repositories identifiers, and in this example, the user may provide a plurality of hyperlinks, URLs, or established directory paths representing a plurality of repositories.

At block 304, the development environment 204 scans the specified repository to identify source code files for the specified project that include the search term. The development environment 204 scans the specified repository in response to receiving the search request at block 302. The development environment 204 communicates to the repository environment 206 to access the source code files for the specified project within the specified repository.

In an example embodiment, the user interface is configured to display real-time metrics while the source code files are being scanned. The user interface may display information related to the progression of the scan, for example, the number of source code files that have been scanned, the number of source code files that remain to be scanned, the name of the current source code file being scanned, and the like. The user interface may also display the number of source code files (from the files that have been scanned) that contain the search term and the number of source code files (from the files that have been scanned) that do not contain the search term. These numbers are updated as the scanning tool continues to scan the source code files in the repository.

At block 306, the development environment 204 determines whether an instance of a search term within the source code files corresponds to a reserved term. The instance of a search term is determined to correspond to a reserved term based on a context or usage of the instance of the search within the source code. The reserved term is based on the programming language that the source code files are implemented in. The user may provide, via the user interface, one or more reserved terms for the scanning tool system 200 to analyze with respect to the instances of search term within the source code files. The reserved term may be similar to the search term, and based on the context or usage, the development environment 204 recognizes that a particular instance of a search term is a reserved term. For example, the search term provided by the user may be "store." The scanning tool detects all instances of "store" within a file, including, for example the term "store_variable." The user may know that "store_variable" is a term used as part of the programming language construct and commands. However, the scanning tool includes this instance of match in the report, and the user has to analyze the context of the match to determine that the particular match is not relevant since it relates to a programming command "store_variable." The software scanning tool described herein, provides a mechanism for the user to easily recognize such reserved terms so that the user does not spend time analyzing the context of the match.

In this example, the user can provide "store_variable" as a reserved term. The user may indicate the reserved term as "store_variable" based on his knowledge of the programming language and source code file, and considering that "store_variable" is a term that is used as part of the programming language construct or command. Therefore, during the scan, the user may not be interested in locating the term "store_variable" in the program file. When a match is found for the term "store," the scanning tool, at block 306, determines whether this match corresponds to the reserved term "store_variable." If this instance of the match corresponds to the reserved term, then, as described below, it is indicated in the report in the code segment that the match corresponds to a reserved term.

At block 308, the development environment module 204 creates a new file directory to store the results of the scan. In an example embodiment, the user environment 202 may create the new file directory within the specified repository or in a separate repository to store the results of the scan.

At block 310, the development environment 204 generates a report identifying the source code files that include an instance of the search term. The report includes a line number in the source code of the source code files at which the instance of the search term is found. The report also includes the name of the software module within the source code at which the instance of the search term is found. The report further includes a segment of the source code that contains the instance of the search term, where the segment of the code indicates whether the instance of the search term corresponds to a reserved term. If the source code files are scanned for a plurality of search terms, then the generated report includes a code segment for each instance of a search term of the plurality of search terms. For example, if the source code files are scanned for the search terms "store" and "number," then the report includes a code segment from the source code file where the term "store" is found, and a code segment where the term "number" is found. If multiple repositories are scanned for a search term, then a separate report may be generated for each repository. In some embodiments, a separate file directory is created by the development environment for each repository that is scanned or the separate reports can be stored in a common file directory created by the development environment in response to the scan.

As discussed, the report includes the segment of the code that contains the instance of the search term, and the segment of the code indicates whether this instance of the search term corresponds to a reserved term. Continuing with an example described above, where the search term is "store" and the reserved term is "store_variable," the report in this example, indicates in the code segment when the match corresponds to "store_variable." In an example embodiment, the report includes a visual indicator in the code segment identifying the instance of the search term as the reserved term. For example, the code segment indicating the reserved term in this case includes "xxxxx_variable," where "xxxxx" indicates "store." That is, the code scanning tool can modify the code segment to replace the search term "store" in the code segment provided by the report with "xxxxx" where the reserved term "store_variable" is found to indicate to the user that in this instance the match corresponds to a reserved term. The user can easily look at the modified code segment and determine that the match corresponds to the reserved term, and does not have to spend time analyzing the context. In an example embodiment, the user can provide a plurality of reserved terms.

At block 312, the development environment 204 populates the new file directory with a first results file including the generated report. The development environment 204 also populates the new file directory with a second results file including another report that identifies the source code files for the specified software project in the specified repository that do not include the search term. In an example embodiment, if multiple repositories are scanned, then a separate first results file with a report identifying source code files that include the search term, and a separate second results file with a report identifying source code files that do not include the search term may be created for each repository. In an alternative embodiment, one first results file and one second results file may be created for the multiple repositories, where the first results file includes a plurality of reports, each corresponding to a repository. Similarly, the second results file includes a plurality of reports, each corresponding to a repository.

In an example embodiment, a list of source code files for the specified project that include an instance of the search term is generated. A list of source code files for the specified project that do not include a search term is also generated. In another embodiment, the list of source code files that contain the search term is selectable by the user. The user may select a source code file from the list, and in response, the source code is displayed on the user device in the appropriate application so that the user can modify the source code.

In an example embodiment, the software scanning tool provides a summary report after the scan of all of the source code files specified in the search request is completed. In some embodiments, the software scanning tool provides a clean-up utility which when executed, removes the file directories and associated program files from the user's computing system that were generated during the scanning process.

FIG. 4 is an exemplary user interface screen 400 illustrating a summary report for a software scanning tool, according to an example embodiment. Once the scanning tool successfully completes execution, user interface screen 400 is displayed. As illustrated in FIG. 4, the user interface screen 400 includes information related to the scan. For example, the user interface screen 400 includes a number of repositories scanned (shown by element 402), the number of source code files scanned (shown by element 404), the name of the file that contains the names of the files where a match was found (shown by element 406), the name of the file that contains the names of the files where a match was not found (shown by element 408). The user interface screen 400 also includes the number of files that contain the search term (shown by element 410), and the number of files that do not contain the search term (shown by element 412).

FIG. 5 is an exemplary user interface screen 450 illustrating a report for a software scanning tool, according to an example embodiment. The user interface screen 450 is displayed when a user views a particular report identifying the source code files that contain the search term. The user interface screen 450 includes a line number where the search term was detected (shown by element 452), the search term that was scanned for (shown by element 454), and the name of the file that contains the search term (shown by element 456).

FIG. 6 is an exemplary user interface screen 475 illustrating a report with a reserved term for a software scanning tool, according to an example embodiment. As discussed, the report includes a segment of the code that contains the instance of the search term, and the segment of the code indicates whether this instance of the search term corresponds to a reserved term. As the example shown in FIG. 6 illustrates, the search term is "str" (shown at element 478) and the reserved term is "struct." The report in this example, indicates in the code segment when the match corresponds to the reserved term "struct" using a visual indicator in the code segment identifying the instance of the search term as the reserved term. For example, the scanning tool identifies code segment "typedef struct STRUC_EMSTAT" as containing the search term "str." The corresponding report includes the code segment indicating the reserved term as "xxxxxx_STRUC_EMSTAT" (shown at element 476) where "xxxxxx" indicates "struct." That is, the code scanning tool can modify the code segment to replace the search term "str" in the code segment provided by the report with "xxxxxx" where the reserved term "struct" is found to indicate to the user that in this instance the match corresponds to a reserved term.

FIG. 7 is an exemplary user interface screen 480 illustrating file directories generated by the software scanning tool, according to an example embodiment. As discussed above, the scanning tool software generates file directories including reports for source code files that contain the search term and source code files that do not contain the search term. As shown in FIG. 7, a file directory "lwpickup" is generated as shown by element 482. Corresponding matches and zero files (shown by element 486) are also generated, which respectively include a report for source code files containing the search term, and a report for source code files that do not contain the search term.

Figure 8:
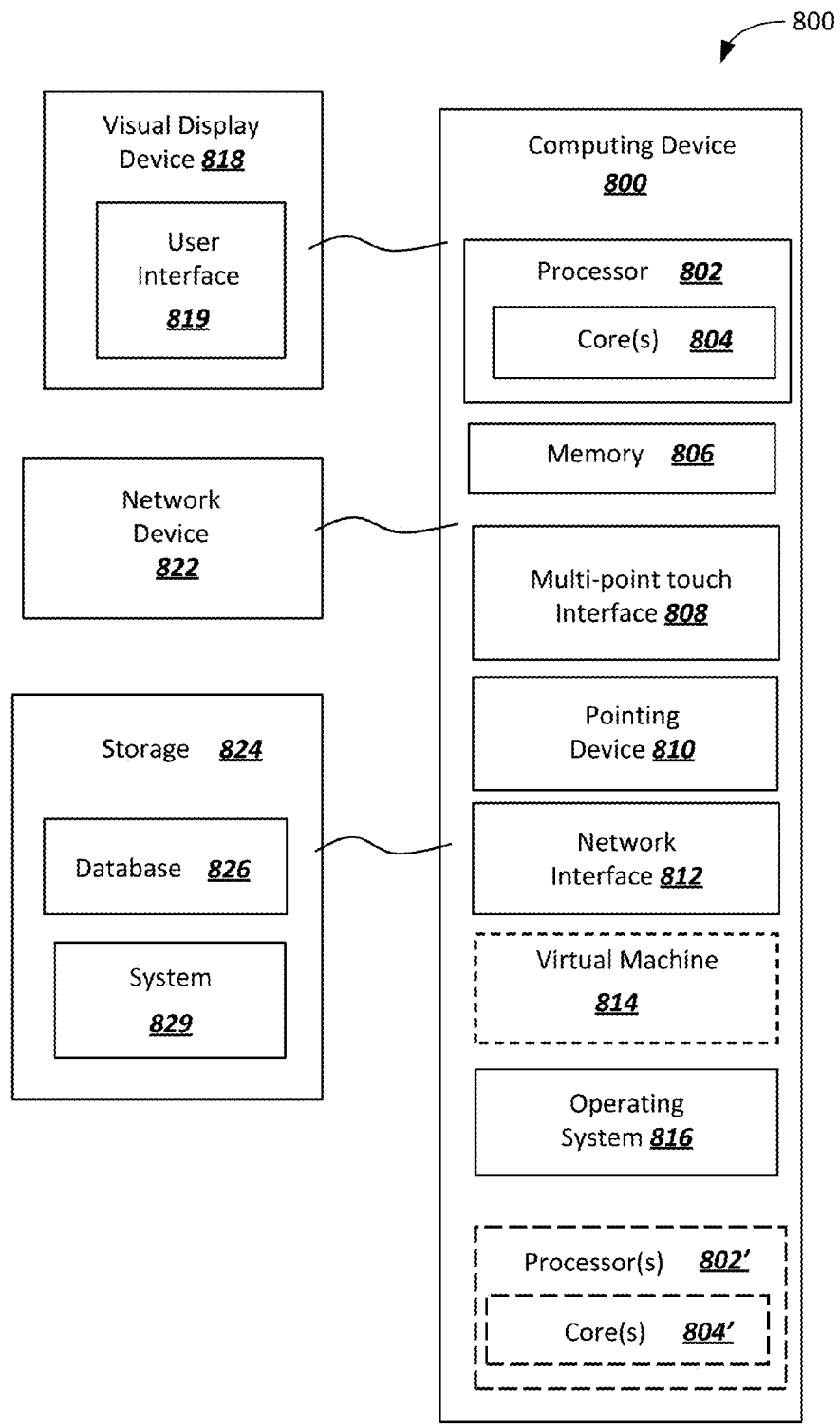
FIG. 8 is a block diagram of an exemplary computing device that may be used to implement exemplary embodiments of the software scanning tool described herein.

FIG. 8 is a block diagram of an exemplary computing device 800 that can be used to perform any of the methods provided by exemplary embodiments. The computing device 800 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 806 included in the computing device 800 can store computer-readable and computer-executable instructions or software for implementing exemplary embodiments. The computing device 800 also includes processor 802 and associated core 804, and optionally, one or more additional processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' can each be a single core processor or multiple core (804 and 804') processor.

Virtualization can be employed in the computing device 800 so that infrastructure and resources in the computing device can be shared dynamically. A virtual machine 814 can be provided to handle a process running on multiple processors so that the process appears to be using only one computing resource rather than multiple computing resources. Multiple virtual machines can also be used with one processor.

Memory 806 can include a computer system memory or random access memory, such as DRAM, SRAM, EDO RAM, and the like. Memory 806 can include other types of memory as well, or combinations thereof.

A user can interact with the computing device 800 through a visual display device 818, such as a touch screen display or computer monitor, which can display one or more user interfaces 819 that can be provided in accordance with exemplary embodiments, for example, the exemplary interfaces illustrated in FIGS. 4-7. The visual display device 818 can also display other aspects, elements and/or information or data associated with exemplary embodiments, for example, views of databases, source code, and the like. The computing device 800 can include other I/O devices for receiving input from a user, for example, a keyboard or any suitable multi-point touch interface 808, a pointing device 810 (e.g., a pen, stylus, mouse, or trackpad). The keyboard 808 and the pointing device 810 can be coupled to the visual display device 818. The computing device 800 can include other suitable conventional I/O peripherals.

The computing device 800 can also include one or more storage devices 824, such as a hard-drive, CD-ROM, or other non-transitory computer readable media, for storing data and computer-readable instructions and/or software, such as the system 829 that implements exemplary embodiments of the software scanning tool as taught herein, or portions thereof, which can be executed to generate user interface 819 on display 818. Exemplary storage device 824 can also store one or more databases for storing any suitable information required to implement exemplary embodiments. The databases can be updated by a user or automatically at any suitable time to add, delete or update one or more items in the databases. Exemplary storage device 824 can store one or more databases 826 for storing software repositories, project files, application files, search reports, search results, and any other data/information used to implement exemplary embodiments of the systems and methods described herein.

The computing device 800 can include a network interface 812 configured to interface via one or more network devices 822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 812 can include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 800 can run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 816 can be run in native mode or emulated mode. In an exemplary embodiment, the operating system 816 can be run on one or more cloud machine instances.

As such, systems, methods and non-transitory computer readable medium are described for a software scanning tool. Example embodiments provide a structured report that aggregates information related to a plurality of source code files based on selective scanning of a software repository. The software scanning tool provides the user the ability to search for specific or multiple search terms within any program which resides within a single or multiple repositories. The software scanning tool detects a match, and generates a report detailing where the search term was found, for example, the line number in the software module. The software scanning tool also generates a code segment or snippet that contains the search term, which provides the user a context on how the search term is used within the program. The name of the software modules where matches are found are also provided to the user as part of the results of the scanning tool. If a module within a repository does not have any matches against the search term or terms, a report is generated by the software scanning tool listing the name of such module. This eliminates the user spending time and effort reviewing the modules that do not contain the search term. In an example embodiment, the software scanning tool provides real-time metrics to the user detailing the repository being scanned, the current software module being scanned, the number of modules processed, and the number of matches and non-matches found. Once the scanning tool has completed its execution, it provides summary information to the user via a user interface, and maintains the repositories with their programs intact for further analysis. The scanning tool also determines if a match of the search term in a software module corresponds to a reserved word.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A method for creating a structured report that aggregates information related to a plurality of source code files based on selective scanning of one or more repositories, the method comprising:

providing a user interface operable to access a source repository;

receiving, from a user via the user interface, a repository search request, the search request including a repository identifier associated with the source repository in which source code files are stored for a plurality of software projects, a project identifier associated with a specified software project corresponding to one of the plurality of software projects stored within the source repository, and a search term;

scanning the specified repository for source code files corresponding to the specified software project in response to the search request to identify source code files for the specified software project that include the search term;

determining whether an instance of the search term within the source code files corresponds to a reserved term based on a context or usage of the instance of the search term within the source code, the reserved term being associated with a programming language implemented within the source code files;

creating, in response to the search request, a new file directory in a non-transitory computer-readable medium;

generating a report identifying the source code files that include an instance of the search term, the report including a line number in the source code of the source code files at which the instance of the search term is found, a name of a software module within the source code at which the instance of search term is found, and a segment of the source code that contains the instance of the search term, the segment of code indicating whether the instance of the search term corresponds to the reserved term;

populating the new file directory with a first results file including the report and a second results file including a further report, the further report identifying the source code files for specified software project in the specified repository that do not include the search term; and updating the user interface, responsive to populating the new file directory with a first results file and the second results file, to display content from the first results file and the second file, wherein the updating comprises displaying the segment of the source code that contains the instance of the search term, the segment of code indicating whether the instance of the search term corresponds to the reserved term.

2. The method of claim 1, wherein a plurality of search terms is received simultaneously from the user, and the specified repository is scanned for the plurality of search terms simultaneously.

3. The method of claim 2, wherein the report is generated to include a plurality of segments of source code, each segment contains one of the plurality of search terms.

4. The method of claim 1, wherein a plurality of repository identifiers associated with a plurality of source repositories is received.

5. The method of claim 4, wherein a plurality of reports are generated, each report corresponding to a source repository of the plurality of source repositories.

6. The method of claim 1, wherein the reserved term comprises a subset of characters of the search term.

7. The method of claim 1, further comprising:
displaying real-time metrics during the scanning of the specified repository, the real-time metrics including the number of source code files that are scanned, a name of the current source code file being scanned, the number of source code files containing an instance of the search term, and the number of source code files not containing an instance of the search term.

8. The method of claim 1, further comprising:
generating a list of source code files for the specified software project that include an instance of the search term; and
generating a list of source code files for the specified software project that do not include an instance of the search term.

9. The method of claim 1, further comprising:
generating a selectable list of source code files for the specified software project that includes an instance of the search term.

10. The method of claim 9, further comprising:
receiving a selection input from the user selecting a source code file from the selectable list; and
displaying source code from the source code file selected by the user, and enabling the user to modify the source code.

11. The method of claim 1, wherein in response to a determination that the instance of the search term corresponds to a reserved term, the report is generated to include a visual indicator in the segment of code modifying the instance of the search term as the reserved term.

12. A system for creating a structured report that aggregates information related to a plurality of source code files based on selective scanning of one or more repositories, the system comprising:
a memory: and
a processor configured to execute instructions stored in the memory, causing the system to:
provide a user interface operable to access a source repository;
receive, from a user via the user interface, a repository search request, the search request including a repository identifier associated with the source repository in which source code files are stored for a plurality of software projects, a project identifier associated with a specified software project corresponding to one of the plurality of software projects stored within the source repository, and a search term;
scan the specified repository for source code files corresponding to the specified software project in response to the search request to identify source code files for the specified software project that include the search term;
determine whether an instance of the search term within the source code files corresponds to a reserved term based on a context or usage of the instance of the search term within the source code, the reserved term being associated with a programming language implemented within the source code files;
create, in response to the search request, a new file directory in a non-transitory computer-readable medium;
generate a report identifying the source code files that include an instance of the search term, the report including a line number in the source code of the source code files at which the instance of the search term is found, a name of a software module within the source code at which the instance of search term is found, and a segment of the source code that contains the instance of the search term, the segment of code indicating whether the instance of the search term corresponds to the reserved term;
populate the new file directory with a first results file including the report and a second results file including a further report, the further report identifying the source code files for specified software project in the specified repository that do not include the search term and;
update the user interface, responsive to populating the new file directory with a first results file and the second results file, to display content from the first results file and the second file, wherein the updating comprises displaying the segment of the source code that contains the instance of the search term, the segment of code indicating whether the instance of the search term corresponds to the reserved term.

13. The system of claim 12, wherein the processor is further configured to:
display real-time metrics during the scanning of the specified repository, the real-time metrics including the number of source code files that are scanned, a name of the current source code file being scanned, the number of source code files containing an instance of the search term, and the number of source code files not containing an instance of the search term.

14. The system of claim 12, wherein the processor is further configured to:
generate a selectable list of source code files for the specified software project that includes an instance of the search term.

15. The system of claim 14, wherein the processor is further configured to:
receive a selection input from the user selecting a source code file from the selectable list; and
display source code from the source code file selected by the user, and enable the user to modify the source code.

16. The system of claim 12, wherein in response to a determination that the instance of the search term corresponds to a reserved term, the report is generated to include a visual indicator in the segment of code modifying the instance of the search term as the reserved term.

17. A non-transitory machine-readable medium storing instructions executable by a processing device, wherein execution of the instructions causes the processing device to implement a method for creating a structured report that aggregates information related to plurality of source code files based on selective scanning of one or more repositories, the method comprising:
providing a user interface operable to access a source repository;
receiving, from a user via the user interface, a repository search request, the search request including a repository identifier associated with the source repository in which source code files are stored for a plurality of software projects, a project identifier associated with a specified software project corresponding to one of the plurality of software projects stored within the source repository, and a search term;
scanning the specified repository for source code files corresponding to the specified software project in response to the search request to identify source code files for the specified software project that include the search term;
determining whether an instance of the search term within the source code files corresponds to a reserved term based on a context or usage of the instance of the search term within the source code, the reserved term being associated with a programming language implemented within the source code files;
creating, in response to the search request, a new file directory in a non-transitory computer-readable medium;
generating a report identifying the source code files that include an instance of the search term, the report including a line number in the source code of the source code files at which the instance of the search term is found, a name of a software module within the source code at which the instance of search term is found, and a segment of the source code that contains the instance of the search term, the segment of code indicating whether the instance of the search term corresponds to the reserved term;
populating the new file directory with a first results file including the report and a second results file including a further report, the further report identifying the source code files for specified software project in the specified repository that do not include the search term; and
updating the user interface, responsive to populating the new file directory with a first results file and the second results file, to display content from the first results file and the second file, wherein the updating comprises displaying the segment of the source code that contains the instance of the search term, the segment of code indicating whether the instance of the search term corresponds to the reserved term.

18. The non-transitory machine readable medium of claim 17, further comprising:
displaying real-time metrics during the scanning of the specified repository, the real-time metrics including the number of source code files that are scanned, a name of the current source code file being scanned, the number of source code files containing an instance of the search term, and the number of source code files not containing an instance of the search term.

19. The non-transitory machine readable medium of claim 17, further comprising:
generating a selectable list of source code files for the specified software project that includes an instance of the search term.

20. The non-transitory machine readable medium of claim 17, wherein in response to a determination that the instance of the search term corresponds to a reserved term, the report is generated to include a visual indicator in the segment of code identifying the instance of the search term as the reserved term.

* * * * *